United States Patent
Herb et al.

(10) Patent No.: US 6,718,249 B2
(45) Date of Patent: Apr. 6, 2004

(54) REGULATING METHOD FOR INCREASING THE TRACTION OF A VEHICLE WHILE MAINTAINING CONSTANT VEHICLE STABILITY

(75) Inventors: Eugen Herb, Munich (DE); Alfred Straub, Egenhofen (DE); Uwe Hartmann, Gerlingen (DE)

(73) Assignees: Bayerische Motoren Werke Aktiengesellschaft, Munich (DE); Robert Bosch GmbH, Stuttgart (DE)

(*) Notice: Subject to any disclaimer, the term of this patent is extended or adjusted under 35 U.S.C. 154(b) by 42 days.

(21) Appl. No.: 10/203,104
(22) PCT Filed: Oct. 30, 2001
(86) PCT No.: PCT/EP01/12507
§ 371 (c)(1),
(2), (4) Date: Aug. 6, 2002
(87) PCT Pub. No.: WO02/40306
PCT Pub. Date: May 23, 2002

(65) Prior Publication Data
US 2003/0014177 A1 Jan. 16, 2003

(30) Foreign Application Priority Data
Nov. 16, 2000 (DE) .......................................... 100 56 760

(51) Int. Cl.$^7$ ................................................ B60T 8/32
(52) U.S. Cl. ............................ 701/90; 701/82; 180/197
(58) Field of Search ........................... 701/82, 83, 84, 701/85, 86, 87, 88, 89, 90; 180/197

(56) References Cited

U.S. PATENT DOCUMENTS

| 4,763,262 | A | * | 8/1988 | Leiber | 701/90 |
| 4,763,263 | A | * | 8/1988 | Leiber | 701/90 |
| 4,849,891 | A | * | 7/1989 | Krohn et al. | 701/89 |
| 5,293,315 | A | * | 3/1994 | Kolbe et al. | 701/90 |
| 5,445,442 | A | * | 8/1995 | Barth et al. | 303/141 |
| 6,240,355 | B1 | * | 5/2001 | Schmitt | 701/84 |
| 6,460,647 | B1 | * | 10/2002 | Schmitt | 180/197 |
| 2003/0107265 | | * | 6/2003 | Arnold | 303/139 |

FOREIGN PATENT DOCUMENTS

| DE | 3500428 | 8/1985 |
| DE | 3635095 | 4/1987 |
| DE | 3546575 | 10/1987 |
| DE | 3924582 | 10/1992 |
| DE | 3740433 | 12/1992 |
| DE | 4102301 | 10/1994 |
| DE | 4123232 | 11/1995 |
| DE | 19855332 | 6/2000 |
| EP | 0363306 | 1/1991 |

* cited by examiner

Primary Examiner—Gary Chin
(74) Attorney, Agent, or Firm—Crowell & Moring LLP

(57) ABSTRACT

In a control process for increasing the traction in the case of a vehicle while the vehicle stability remains almost the same, a wheel slip is determined at the powered wheels and is compared with at least one slip threshold value. The driving power is reduced when the wheel slip exceeds the slip threshold value. For improving the traction on a loose base, at least one slip integral is formed between the powered and the non-powered wheels. The at least one slip threshold value is continuously determined as a function of the at least one slip integral.

18 Claims, 2 Drawing Sheets

REGULATING METHOD FOR INCREASING THE TRACTION OF A VEHICLE WHILE MAINTAINING CONSTANT VEHICLE STABILITY

BACKGROUND AND SUMMARY OF THE INVENTION

The invention relates to a control process for increasing the traction in the case of a vehicle, while maintaining the same vehicle stability.

Wheel slip control systems or slip control systems for motor vehicles are sufficiently known. In the case of conventional slip control systems, a compromise is usually accepted between a demanded driving stability and a good traction of a vehicle. In particular, the slip at the driven wheels is usually kept within fixed slip limits. As a result of the accepted compromise between propulsion and driving stability, only insufficient propulsion can be achieved under certain road conditions, for example, on gravel, in sludge or in deep snow.

It is an object of the invention to further develop a control process of the above-mentioned type by which good traction can be achieved while the vehicle stability remains the same even on routes having a loose base.

This object is achieved by a control process for increasing the traction in the case of a vehicle while the vehicle stability remains the same, a wheel slip being determined at the powered wheels and being compared with at least one slip threshold value. The driving power is reduced when the wheel slip exceeds the slip threshold value. At least one slip integral is formed from the speed differentials between the powered and the non-powered wheels, and the at least one slip threshold value is continuously determined as a function of the at least one slip integral.

Accordingly, a wheel slip threshold value is determined and set according to the situation. In this case, at least one slip integral is formed by means of the wheel speeds at the powered and at the non-powered axle and the vehicle reference speed respectively and conclusions are drawn therefrom with respect to the road conditions. As a function of the road conditions (for example, deep snow, routes with a low coefficient of friction, routes with a high coefficient of friction, wet road), the optimal slip will fluctuate considerably. According to the slip integral, the threshold value for the wheel slip is changed and is thus adapted to the driving conditions. Thus, the actual slip value can be optimally increased or decreased. According to the invention, at least one slip threshold value can be adapted. However, several slip threshold values can also be changed correspondingly.

A low wheel slip threshold value is preferably defined in a standard program. Within the scope of the slip integration, the absolute slip as well as the time-related driving torque course are assessed. Furthermore, by way of an existing sensor arrangement of a drive control system used in the vehicle, preferably at least one of the values is determined from the yaw velocity, the steering angle dynamics and the lateral acceleration and is taken into account during the control process.

Thus, for example, starting from a threshold amount of the vehicle's lateral dynamics, which is to be derived, for example, from the lateral acceleration, a standard program can be selected. This standard program does without a particularly good traction and has the vehicle stability as a priority. In this case, the change-over preferably does not take place discontinuously. On the contrary, the wheel slip threshold value is changed continuously (slip threshold expansion).

A consideration of other driving-dynamic quantities (such as the steering angle activity, the yaw rate course, etc.) may be superimposed on the evaluation of the pure lateral dynamics, which may have the result that, also when the lateral acceleration is low, a standard program with a minimal slip threshold value is used.

According to an advantageous embodiment of the invention, an increase of the wheel slip threshold value takes place to a certain speed of, for example, 50 km/h to 80 km/h. Above this speed, the threshold value can preferably be returned to a standard threshold value. The change of the threshold value can take place in a linear or progressive manner.

On the whole, a process is provided in which, especially on routes with a loose base, good traction can be achieved. This function can be optionally offered to the driver and, when selected, is preferably indicated visually or acoustically. In particular, as a result of the dynamic change-over to standard programs or small slip values, a sufficient stability can be ensured. The information concerning the stability performance is obtained from the values for the steering angle dynamics, the yaw velocity or the lateral acceleration. Naturally, other quantities can also be used which describe the vehicle stability.

In the following, an embodiment of the present invention is indicated which is explained in detail with respect to the attached drawings.

DETAILED DESCRIPTION OF THE DRAWINGS

In the flow chart, during the implementation of the stability control in step 10, it is first queried whether a traction mode (tract), which can be set by operating a key, was selected by the driver. If this is not so, a branching takes place to the end of the algorithm.

If the traction mode (tract) was selected, it is queried in step 12 whether a wheel slip control (ASC) was selected, which can be switched on and off also by operating a key in the vehicle. If this is not so, a branching also takes place to the end of the algorithm.

If the wheel slip control (ASC) was selected in step 12, it is checked in step 14 whether the vehicle speed v is in a range between a lower speed threshold value v u and an upper speed threshold value v o. In the present case, the lower speed threshold value is assumed to be at 0 km/h and the upper speed threshold value is assumed to be at 80 km/h. If the vehicle speed v is not in this speed window, a branching again takes place to the end of the algorithm.

If the vehicle speed v is within the above speed window and all preceding conditions have been met, a branching to step 16 takes place.

Figure 2:
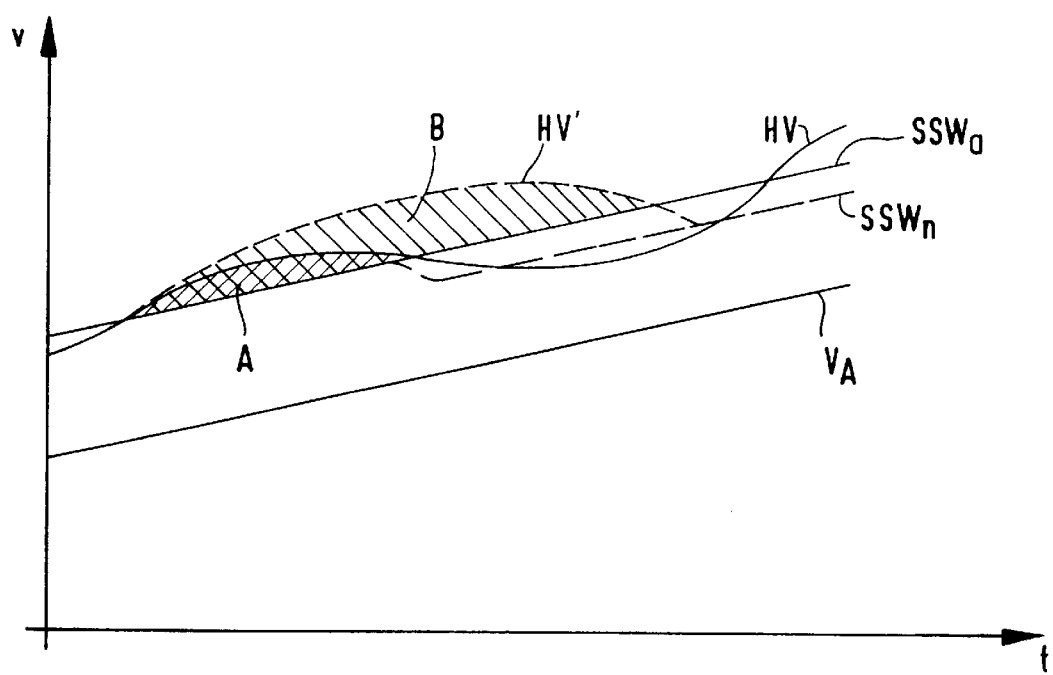
FIG. 2 is a diagram which illustrates a manner of forming a slip integral.

In step 16, a desired slip factor U tract is determined as a function of the vehicle speed v, specifically f(v). In addition, a desired slip limit value $S_2$ is determined from a basic desired slip factor $S_1$ multiplied with the desired slip factor U tract. In FIG. 2, this desired slip limit value $S_2$ corresponds to the desired slip thresholds $SSW_a$ or $SSW_n$.

It will then be checked in step 18 whether an integration value of the actual slip at one of the powered wheels (S HR=integration value actual slip at the right rear wheel, S HL=integration value actual slip at the left rear wheel) is above a desired integration slip limit value S Ü. In this context, reference is made to FIG. 2 which will be explained in the following and in which the meaning of the slip integral is explained. As a function of the slip integral, the slip threshold value is changed. If the slip integral is not too large (no), a branching takes place to step 22, where a desired slip increase factor U Erh is determined as a function of the time (U Erh=f(t). The desired slip limit value $S_2$ is multiplied by this desired slip increase factor U Erh in order to arrive at a new desired slip limit value $S_3$.

If it is determined in step 18 that one or both of the slip integrals of the powered wheels is/are too large, a desired slip reduction factor U Red is determined as a function of the time (U Red=f(t) and, by means of the multiplication with this desired slip reduction factor U Red, a new desired slip limit value S3 is computed.

Then, in step 24, to which a branching takes place from steps 20 and 22, a lateral dynamics slip factor U Q is determined as a function of the lateral acceleration AY, of the steering angle LW, of the rate of rotation DR and of the time t, and a new desired slip $S_4$ is determined by a multiplication of the old desired slip $S_3$ with this value U Q.

As a result of this control, the slip threshold limit value, particularly a slip threshold expansion, can be continuously adjusted. In this case, the longitudinal dynamics are taken into account in steps 20 and 22 and the lateral dynamics are taken into account in step 24.

In particular, during the various computations, slip integrals are formed from the speed differentials between the non-powered and the powered wheels. FIG. 2 is a v-t diagram. In this case, the graph $V_A$ indicates the reference speed of the vehicle, which essentially corresponds to the front wheel speeds in the case of a vehicle powered at the rear wheels. In the present case, the reference speed $V_A$ therefore increases in a uniformly monotonic manner.

Figure 1:
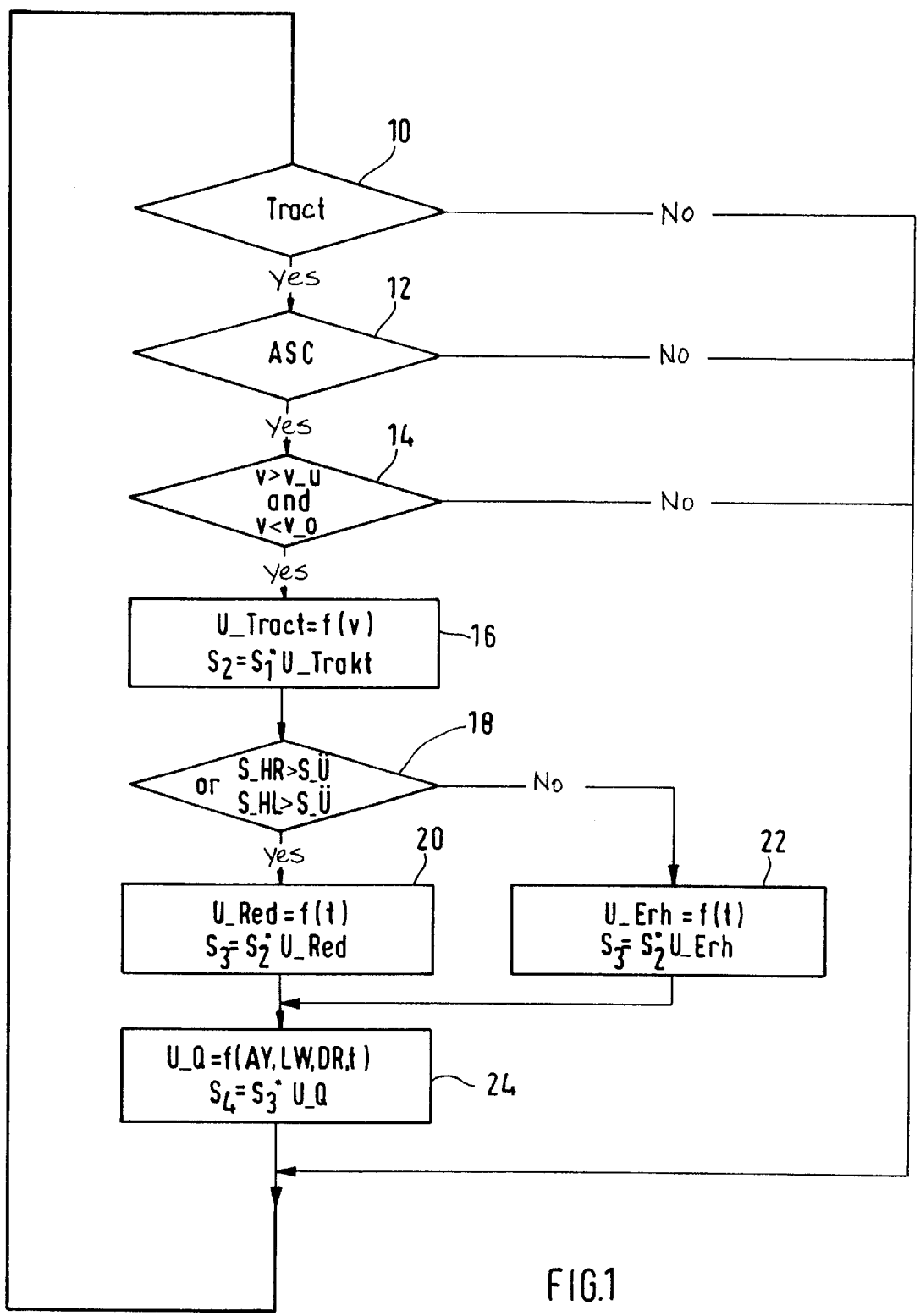
FIG. 1 is a flow chart which indicates a part of a stability dynamics control in the case of a vehicle.

A wheel slip threshold value $SSW_a$ is indicated parallel to the reference speed $V_A$, which wheel slip threshold value $SSW_a$ is selected as a function of the vehicle speed and to which the rear wheel speed HV is adjusted. As a result of the control, the rear wheel speed HV fluctuates about the wheel slip threshold value $SSW_a$. If the rear wheel speed HV is above the threshold value $SSW_a$, the rear wheels are running at an excessive slip. The slip difference (here, with positive preceding signs) is integrated over the time (area A) and is compared with the given slip integral values (compare S Ü in FIG. 1).

If a slip integral is too large, which is indicated in the manner of an example by means of the hatched area below the alternative broken-line rear wheel speed HV' with area B, the slip threshold value SSW is lowered. In FIG. 2, this is illustrated in the form of the new slip threshold value $SSW_n$. If the slip integral were too low, the slip threshold value would be raised as a countermove (not shown in detail). In this manner, the slip threshold valve will be continuously changed. After a change of the slip threshold value, the rear wheel speed will now be adjusted to the respective new value.

FIG. 2 does not show a superimposition by means of a lateral dynamics control, according to which a threshold value increase is completely retracted starting at a certain lateral dynamics value so that, in the case of fast cornering or in the case of cornering and adverse road conditions, the vehicle stability has priority.

What is claimed is:

1. A control process for increasing traction in a vehicle while maintaining vehicle stability, the method comprising the acts of:
   forming at least one slip integral from speed differentials between powered and non-powered wheels of the vehicle;
   continuously determining at least one slip threshold value as a function of the at least one slip integral;
   determining a wheel slip at the powered wheels; and
   comparing the wheel slip with the at least one slip threshold value, driving power being reduced when the wheel slip exceeds the slip threshold value.

2. The control process according to claim 1, wherein several slip integrals are formed and several slip threshold values are continuously determined as a function of the respective several slip integrals.

3. The control process according to claim 1, wherein the at least one slip integral is computed from a rotating speed of at least one powered wheel which is above the slip threshold value.

4. The control process according to claim 2, wherein the at least one slip integral is computed from a rotating speed of at least one powered wheel which is above the slip threshold value.

5. The control process according to claim 1, wherein the at least one slip threshold value is additionally determined as a function of at least one of: quantities from a lateral acceleration of the vehicle, steering angle dynamics and yaw velocity of the vehicle.

6. The control process according to claim 2, wherein the at least one slip threshold value is additionally determined as a function of at least one of: quantities from a lateral acceleration of the vehicle, steering angle dynamics and yaw velocity of the vehicle.

7. The control process according to claim 3, wherein the at least one slip threshold value is additionally determined as a function of at least one of: quantities from a lateral acceleration of the vehicle, steering angle dynamics and yaw velocity of the vehicle.

8. The control process according to claim 1, wherein the at least one slip threshold value is continuously changed.

9. The control process according to claim 2, wherein the at least one slip threshold value is continuously changed.

10. The control process according to claim 3, wherein the at least one slip threshold value is continuously changed.

11. The control process according to claim 5, wherein the at least one slip threshold value is continuously changed.

12. The control process according to claim 1, wherein the at least one slip threshold value is additionally determined as a function of vehicle speed.

13. The control process according to claim 2, wherein the at least one slip threshold value is additionally determined as a function of vehicle speed.

14. The control process according to claim 3, wherein the at least one slip threshold value is additionally determined as a function of vehicle speed.

15. The control process according to claim 5, wherein the at least one slip threshold value is additionally determined as a function of vehicle speed.

16. The control process according to claim 8, wherein the at least one slip threshold value is additionally determined as a function of vehicle speed.

17. The control process according to claim 1, wherein values defined under certain conditions are selected for the at least one slip threshold value.

18. In a control process for increasing traction of a vehicle while maintaining vehicle stability in which a wheel slip is determined at powered wheels of the vehicle and compared with at least one slip threshold value such that driving power is reduced when the wheel slip exceeds the slip threshold value, the process comprising the acts of:
   forming at least one slip integral from speed differentials between the powered and non-powered wheels of the vehicle; and
   continuously determining the at least one slip threshold value as a function of the at least one slip integral.

* * * * *